US012233677B2

(12) United States Patent
Corsico

(10) Patent No.: US 12,233,677 B2
(45) Date of Patent: Feb. 25, 2025

(54) SUSPENSION SYSTEM FOR AN OFF-ROAD VEHICLE UTILIZING HYDRAULICALLY COUPLED REMOTE MOUNTED SPRINGS

(71) Applicant: Corscio Grand Prix, LLC, Potomac, MD (US)

(72) Inventor: Jonathan L. Corsico, Potomac, MD (US)

(73) Assignee: Corsico Grand Prix, LLC, Potomac, MD (US)

( * ) Notice: Subject to any disclaimer, the term of this patent is extended or adjusted under 35 U.S.C. 154(b) by 148 days.

(21) Appl. No.: 17/856,789

(22) Filed: Jul. 1, 2022

(65) Prior Publication Data

US 2022/0332159 A1    Oct. 20, 2022

Related U.S. Application Data

(63) Continuation-in-part of application No. 16/913,984, filed on Jun. 26, 2020, now Pat. No. 11,524,541.

(60) Provisional application No. 62/981,941, filed on Feb. 26, 2020.

(51) Int. Cl.
*B60G 11/16* (2006.01)
*B60G 17/015* (2006.01)
*B60G 3/18* (2006.01)

(52) U.S. Cl.
CPC ............ *B60G 11/16* (2013.01); *B60G 17/015* (2013.01); *B60G 3/18* (2013.01); *B60G 2202/12* (2013.01); *B60G 2202/24* (2013.01); *B60G 2202/42* (2013.01); *B60G 2300/07* (2013.01); *B60G 2500/30* (2013.01); *B60G 2600/20* (2013.01); *B60G 2800/914* (2013.01)

(58) Field of Classification Search
CPC .. B60G 11/265; B60G 17/016; B60G 17/018; B60G 17/0195; B60G 2202/42; B60G 2300/07; B60G 2500/30; B60G 2600/73
See application file for complete search history.

(56) References Cited

U.S. PATENT DOCUMENTS

| | | | | | |
|---|---|---|---|---|---|
| 3,089,710 | A | * | 5/1963 | Fiala | B60G 17/0162 280/124.112 |
| 4,314,709 | A | * | 2/1982 | Silbernagel | B62D 61/125 280/81.6 |
| 5,265,913 | A | * | 11/1993 | Scheffel | B60G 17/0152 280/5.514 |

(Continued)

*Primary Examiner* — Toan C To
(74) *Attorney, Agent, or Firm* — Rutan & Tucker LLP; Hani Z. Sayed

(57) ABSTRACT

A system and methods are provided for a suspension system of an off-road vehicle that allows the springs to be mounted remotely, in any location on the vehicle, enabling the use of spring sizes, spring rates, motion ratios, and damping profiles that would be impractical with traditional suspension designs. The suspension system includes a hydraulic cylinder coupled between a suspension component and a chassis, in lieu of a conventional spring. The hydraulic cylinder is in fluid communication with another, second hydraulic cylinder, by way of a hydraulic hose. The second hydraulic cylinder presses against a suspension spring that is in contact with a fixed spring stop, thereby transferring spring forces to the wheel. Alternatively, the spring stop may comprise a control actuator that moves, enabling active control over spring load.

17 Claims, 4 Drawing Sheets

(56) References Cited

U.S. PATENT DOCUMENTS

| | | | | |
|---|---|---|---|---|
| 5,601,306 | A * | 2/1997 | Heyring | B60G 17/056 280/5.508 |
| 6,000,702 | A * | 12/1999 | Streiter | B60G 17/016 280/5.514 |
| 6,249,728 | B1 * | 6/2001 | Streiter | B60G 17/0152 280/5.514 |
| 6,267,387 | B1 * | 7/2001 | Weiss | B60G 3/26 280/5.52 |
| 6,877,579 | B1 * | 4/2005 | H.ang.land | B60G 15/067 180/274 |
| 7,377,522 | B2 * | 5/2008 | MacIsaac | B60G 21/007 280/5.506 |
| 8,167,318 | B2 * | 5/2012 | Ryan | B60G 11/006 280/5.506 |
| 11,124,035 | B1 * | 9/2021 | Hall | B60G 17/016 |
| 2008/0272561 | A1 * | 11/2008 | Monk | B60G 21/06 280/124.16 |

* cited by examiner

SUSPENSION SYSTEM FOR AN OFF-ROAD VEHICLE UTILIZING HYDRAULICALLY COUPLED REMOTE MOUNTED SPRINGS

PRIORITY

This application is a continuation-in-part of, and claims priority to, U.S. patent application Ser. No. 16/913,984 filed on Jun. 26, 2020 and U.S. Provisional Application, entitled "Hydraulic Suspension System For Off-Road Vehicles," filed on Feb. 26, 2020 and having application Ser. No. 62/981,941, the entirety of said application being incorporated herein by reference.

FIELD

Embodiments of the present disclosure generally relate to the field of vehicle suspension systems. More specifically, embodiments of the disclosure relate to a system and methods for a hydraulic suspension system for off-road vehicles.

BACKGROUND

Traditional off-road vehicle suspension systems suffer from a number of drawbacks. These drawbacks include: (1) the possible mounting locations of the springs on the vehicle are limited, which in turn limits the minimum and maximum sizes of the springs, limits the available spring rates, often requires the springs to be mounted in the wind stream, introducing aerodynamic drag, occasionally has an adverse impact on weight distribution, and otherwise limits design freedom significantly; (2) the possible motion ratios of the springs with respect to the wheels are limited, which in turn forces selection of a motion ratio that may not be desirable, limits the minimum and maximum size of suspension components, and limits the minimum and maximum velocities of suspension components during suspension movement; (3) a significant tradeoff must be made when selecting the wheel rate of the suspension, in that the wheel rate must be firm enough to support the chassis and its cargo, while also soft enough to allow the suspension to flex over rough terrain with a minimum of disruption to the chassis; (4) a significant tradeoff must be made when selecting the damping rate of the suspension, in that the damping rate must be stiff enough to resist a tendency of the chassis to pitch and roll during acceleration, braking and turning, while at the same time, the damping rate must be soft enough to allow the suspension to absorb bumps and other disturbances with a minimum of disruption to the chassis; (5) anti-roll bars are often required to control the tendency of the chassis to roll during turns, which adds spring force in an undesirable manner when the suspension traverses over a single wheel bump; (6) the ride height of the chassis is determined by the design of the suspension components, and cannot be easily adjusted, if at all; (7) the suspension is passive, meaning that its characteristics are fixed by the vehicle designer and not readily adjustable during operation; and (8) the suspension is purely reactive, meaning that it responds to inputs only after those inputs are received, rather than predictive, meaning that it alters its characteristics in anticipation of possible inputs, before those inputs are received.

Given the foregoing limitations inherent in traditional off-road vehicle suspension systems, there is a desire to improve such designs. This will make off-road vehicles more controllable, more comfortable, able to carry more cargo, faster, and safer. This improved performance is relevant for all types of vehicles that venture onto unpaved roads or off-road, including off-road race vehicles, side-by-sides, military vehicles, construction equipment, farm equipment, and even road vehicles that occasionally venture onto unpaved roads or off-road, such as pickup trucks and sports utility vehicles. Embodiments disclosed herein provide a system and methods for a suspension system that overcome the limitations described above by, among other things, enabling the springs and dampers to be mounted remotely, in any location on the vehicle, and optionally enabling real-time control over the forces of the springs.

SUMMARY

A system and methods are provided for a suspension system of an off-road vehicle that allows the springs to be mounted remotely, in any location on the vehicle, enabling the use of spring sizes, spring rates, motion ratios, and damping profiles that would be impractical with traditional suspension designs. The suspension system includes a hydraulic cylinder coupled between the wheel and the chassis, in lieu of a conventional spring. This cylinder is in fluid communication with another cylinder by way of a hydraulic hose. This second cylinder presses against a suspension spring that is in contact with a fixed spring stop, thus transferring spring forces to the wheel. Alternatively, the spring stop may comprise a control actuator that moves, enabling active control over spring load and, thus, chassis attitude. Alternatively, the control actuator can be mounted as part of the hydraulic circuit between the wheel cylinder and the spring cylinder, to achieve the same functionality.

In an exemplary embodiment, a suspension system for an off-road vehicle comprises: a wheel cylinder for communicating forces on a wheel to a spring cylinder; a spring cylinder for communicating forces to a spring; a spring for creating forces on the spring cylinder; and a spring stop for fixating the spring with respect to the spring cylinder; wherein the configuration of the abovementioned wheel cylinder, spring cylinder and spring stop is such that it enables the use of a spring that is physically too large to be mounted between the vehicle's chassis, on the one hand, and a suspension component, on the other hand.

In another embodiment, the wheel cylinder is coupled between a suspension component and a chassis of the vehicle such that forces on the wheel due to driving the vehicle over terrain are communicated to the spring by way of a hydraulic hose or tube and the spring cylinder. In another embodiment, a hydraulic hose or tube establishes fluid communication between the wheel cylinder and the spring cylinder, whereby forces are communicated between the wheel and the spring. In another embodiment, the hydraulic hose or tube is configured to conduct a suitable hydraulic fluid between the wheel cylinder and the spring cylinder. In another embodiment, the hydraulic hose or tube may include any length suitable for routing fluid communication between the wheel cylinder and the spring cylinder.

In another embodiment, the spring comprises a linear spring that is configured to exhibit a spring force that increases linearly as the spring is compressed. In another embodiment, the spring comprises a progressive spring that is configured to exhibit a spring force that increases at a non-linear rate as the spring is compressed. In another embodiment, the spring consists of more than one spring.

In another embodiment, the suspension is configured to exhibit a wheel rate that is less than the lowest wheel rate that could be obtained using a spring that is physically small enough to be mounted between the vehicle's chassis, on the one hand, and a suspension component, on the other hand.

In another embodiment, the spring is configured to have static preload of least 20% of its free length. In another embodiment, the suspension is configured to have a wheel-to-spring motion ratio of 2.25:1 or greater. In another embodiment, the spring stop comprises any reinforced surface of a chassis of the vehicle that remains fixed with respect to the spring cylinder.

In an exemplary embodiment, a suspension system for an off-road vehicle comprises: a wheel cylinder for communicating forces on a wheel to a spring cylinder; a spring cylinder for communicating forces to a spring; a spring for creating forces on the spring cylinder; and a control actuator that is configured to either press against the spring, in lieu of a fixed spring stop, or press against the hydraulic circuit connecting the spring cylinder to the wheel cylinder; wherein the configuration of the abovementioned wheel cylinder, spring cylinder and control actuator is such that it enables the use of a spring that is physically too large to be mounted between the vehicle's chassis, on the one hand, and a suspension component, on the other hand, and/or a control actuator that is physically too large to be mounted between the vehicle's chassis, on the one hand, and spring, on the other hand, if the spring had been mounted in a traditional prior-art location between the vehicle's chassis, on the one hand, and a suspension component, on the other hand.

In another embodiment, extending the control actuator adds spring force to the suspension and retracting the actuator removes spring force from the suspension. In another embodiment, the control actuator is configured to operate in response to commands from the vehicle's occupants. In another embodiment, the control actuator is configured to operate according to electronic signals received from a suitable computer control system onboard the vehicle. In another embodiment, multiple control actuators are configured to control individual spring forces applied to each of the vehicle's wheels.

In another embodiment, the control actuators are configured to raise the vehicle so as to provide greater ground clearance, or lower the vehicle to provide increased handling or aerodynamic performance. In another embodiment, the control actuators and the computer control system are configured to counteract changes in weight and weight distribution of the vehicle. In another embodiment, the control actuators and the computer control system are configured to enhance handling of the vehicle by counteracting any one or more of chassis roll, chassis pitch, chassis heave, and chassis twist. In another embodiment, a driver control interface is configured to enable a driver of the vehicle to provide real-time inputs for the purpose of affecting the handling of the vehicle. In another embodiment, the system includes an emergency function configured to enable occupants within the vehicle to declare an emergency situation by way of the driver control interface, the emergency function configured to cause the system to automatically perform any of various responsive actions, such as raising the vehicle.

In an exemplary embodiment, a method for a hydraulic suspension system for an off-road vehicle comprises: coupling a suspension component, on the one hand, and the chassis of the vehicle, on the other hand, through a hydraulic device, such as a hydraulic cylinder or hydraulic rotary actuator; establishing fluid communication between the abovementioned hydraulic device attached to the suspension with another hydraulic device in the vehicle, such as another hydraulic cylinder or hydraulic rotary actuator; providing a spring for applying a spring force to the second hydraulic device; and fixating the spring with respect to the chassis by way of a fixed spring stop; wherein the configuration of the abovementioned hydraulic devices and spring stop is such that it enables the use of a spring that is physically too large to be mounted between the vehicle's chassis, on the one hand, and a suspension component, on the other hand.

In another embodiment, establishing fluid communication includes configuring a hydraulic hose or tube to conduct a suitable hydraulic fluid between the two hydraulic devices. In another embodiment, establishing fluid communication includes routing a suitable length of the hydraulic hose or tube between the two hydraulic devices.

In another embodiment, the spring comprises a linear spring that is configured to exhibit a spring force that increases linearly as the spring is compressed. In another embodiment, the spring comprises a progressive spring that is configured to exhibit a spring force that increases at a non-linear rate as the spring is compressed. In another embodiment, the spring consists of more than one spring.

In another embodiment, the suspension is configured to exhibit a wheel rate that is less than the lowest wheel rate that could be obtained using a spring that is physically small enough to be mounted between the vehicle's chassis, on the one hand, and a suspension component, on the other hand. In another embodiment, the spring is configured to have static preload of at least 20% of its free length. In another embodiment, the suspension is configured to have a wheel-to-spring motion ratio of 2.25:1 or greater.

In an exemplary embodiment, a method for a hydraulic suspension system for an off-road vehicle comprises: coupling a suspension component, on the one hand, and the chassis of the vehicle, on the other hand, through a hydraulic device, such as a hydraulic cylinder or hydraulic rotary actuator; establishing fluid communication between the abovementioned hydraulic device attached to the suspension with another hydraulic device in the vehicle, such as another hydraulic cylinder or hydraulic rotary actuator; providing a spring for applying a spring force to the second hydraulic device; and a control actuator that is configured to either press against the spring, in lieu of a fixed spring stop, or press against the hydraulic circuit connecting the two hydraulic devices; wherein the configuration of the abovementioned hydraulic devices and control actuator is such that it enables the use of a spring that is physically too large to be mounted between the vehicle's chassis, on the one hand, and a suspension component, on the other hand, and/or a control actuator that is physically too large to be mounted between the vehicle's chassis, on the one hand, and spring, on the other hand, if the spring had been mounted in a traditional prior-art location between the vehicle's chassis, on the one hand, and a suspension component, on the other hand.

In another embodiment, extending the control actuator adds spring force to the suspension and retracting the actuator removes spring force from the suspension. In another embodiment, the control actuator is configured to operate in response to commands from the vehicle's occupants. In another embodiment, the control actuator is configured to operate according to electronic signals received from a suitable computer control system onboard the vehicle.

In another embodiment, multiple control actuators are configured to control individual spring forces applied to each of the vehicle's wheels. In another embodiment, the control actuators are configured to raise the vehicle so as to provide greater ground clearance, or lower the vehicle to provide increased handling or aerodynamic performance. In another embodiment, the control actuators and the computer control system are configured to counteract changes in weight and weight distribution of the vehicle.

In another embodiment, the control actuators and the computer control system are configured to enhance handling of the vehicle by counteracting any one or more of chassis roll, chassis pitch, chassis heave, and chassis twist. In another embodiment, a driver control interface is configured to enable a driver of the vehicle to provide real-time inputs for the purpose of affecting the handling of the vehicle. In another embodiment, the system includes an emergency function configured to enable occupants within the vehicle to declare an emergency situation by way of the driver control interface, the emergency function configured to cause the system to automatically perform any of various responsive actions, such as raising the vehicle.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
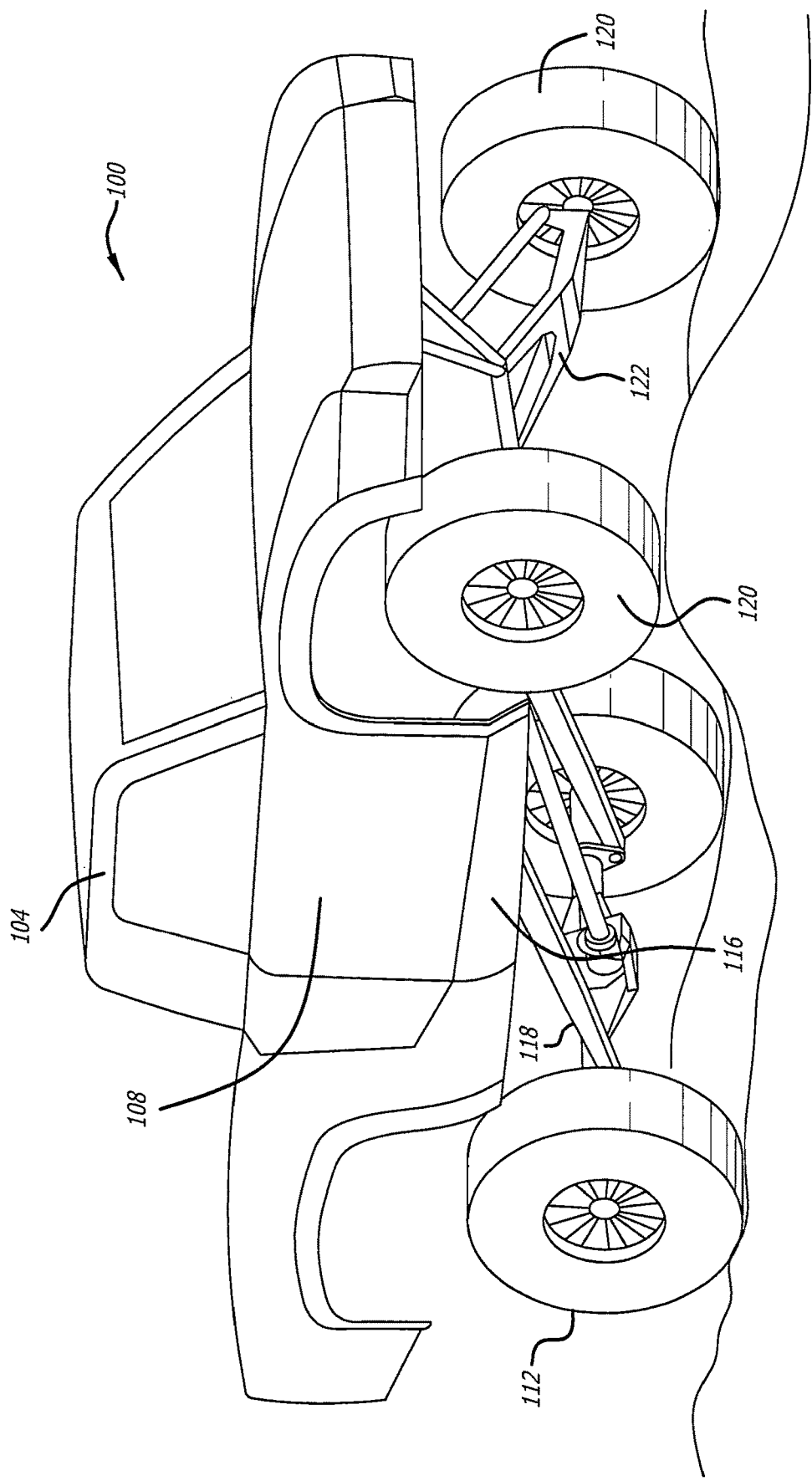
FIG. 1 illustrates an exemplary embodiment of an off-road vehicle that is suitable for implementation of a suspension system in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art, that the invention disclosed herein may be practiced without these specific details. In other instances, specific numeric references such as "first spring," may be made. However, the specific numeric reference should not be interpreted as a literal sequential order but rather interpreted that the "first spring" is different than a "second spring." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Explanation of the Invention

FIG. 1 shows an off-road vehicle 100 that is particularly suitable for implementation of a suspension system in accordance with the present disclosure. Off-road vehicle 100 generally is of an off-road race truck that seats two occupants, includes a roll-over protection system 104, and has a body enclosure 108. Rear wheels 112 of off-road vehicle 100 may be coupled with chassis 116 by way of a four-link trailing arm suspension system 118 coupled to a solid rear axle. Front wheels 120 may be coupled with chassis 116 by way of a double A-arm front suspension system 122. It should be understood, however, that the suspension system disclosed herein is not to be limited to the specific off-road vehicle 100 shown in FIG. 1, but rather the suspension system may be incorporated into a wide variety of vehicles, other than off-road vehicle 100, without limitation.

Figure 2:
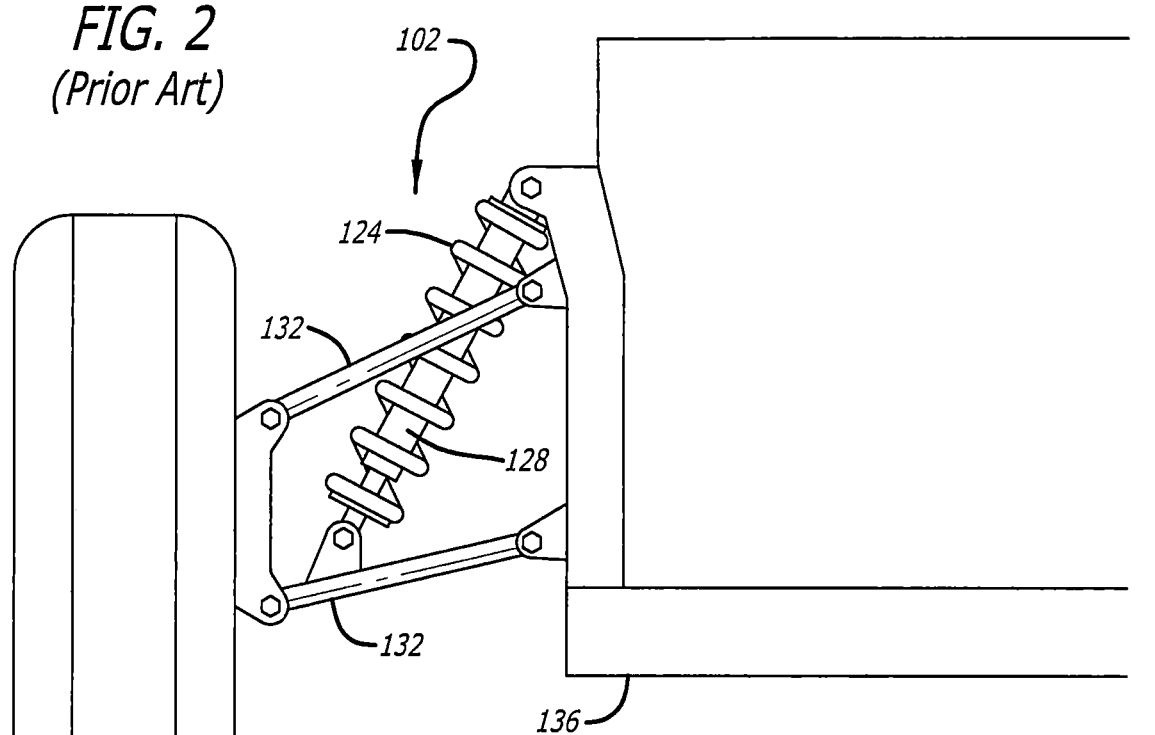
FIG. 2 illustrates a front view of a vehicle that utilizes a conventional coil-over spring and damper system, comprising a coil spring surrounding a shock absorber that is coupled directly between a suspension arm and the chassis of the vehicle.

FIG. 2 illustrates a front view of a conventional double A-arm suspension system 102 that is typically installed in a prior art vehicle. The conventional double A-arm suspension system 102 generally comprises a coil spring 124 surrounding a damper 128 that is mounted directly between a suspension arm 132 that couples a wheel 120 to a chassis 136. As shown in FIG. 2, the conventional suspension system 102 requires coil spring 124 and damper 128 to be physically coupled with suspension arm 132, which is itself physically coupled to the front wheel 120. Thus, the physical location of the spring 124 and damper 128 on the vehicle is essentially fixed, and the space available for the spring 124 and damper 128 is accordingly limited.

Figure 3:
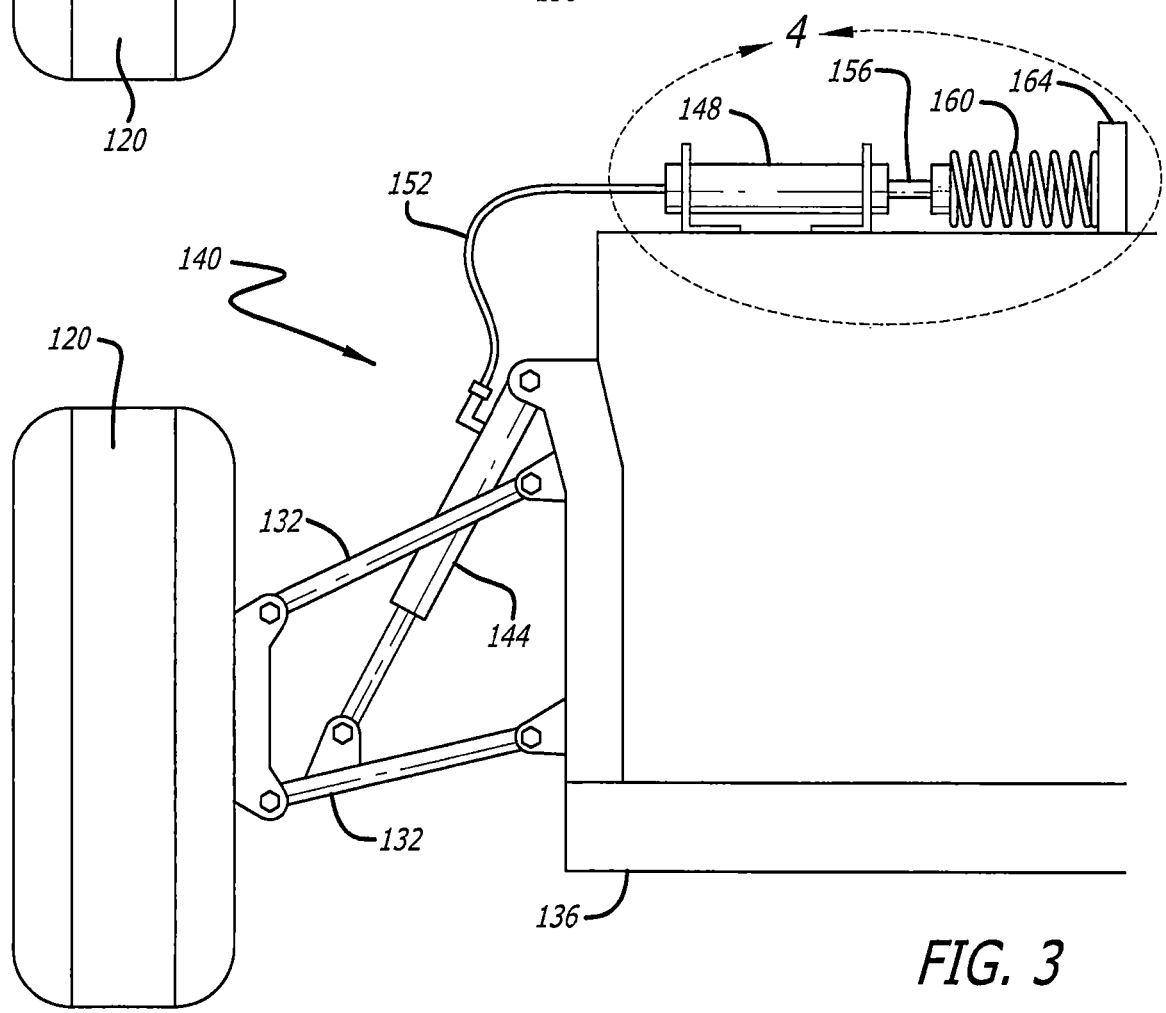
FIG. 3 illustrates a front view of a vehicle that includes an exemplary embodiment of the present disclosure, comprising a hydraulic cylinder coupled between a suspension arm and the chassis of the vehicle (hereinafter referred to as the "wheel cylinder"), hydraulically coupled to another hydraulic cylinder (hereinafter referred to as the "spring cylinder"), and a remotely mounted suspension spring mounted between the spring cylinder and a fixed spring stop.
Figure 4:
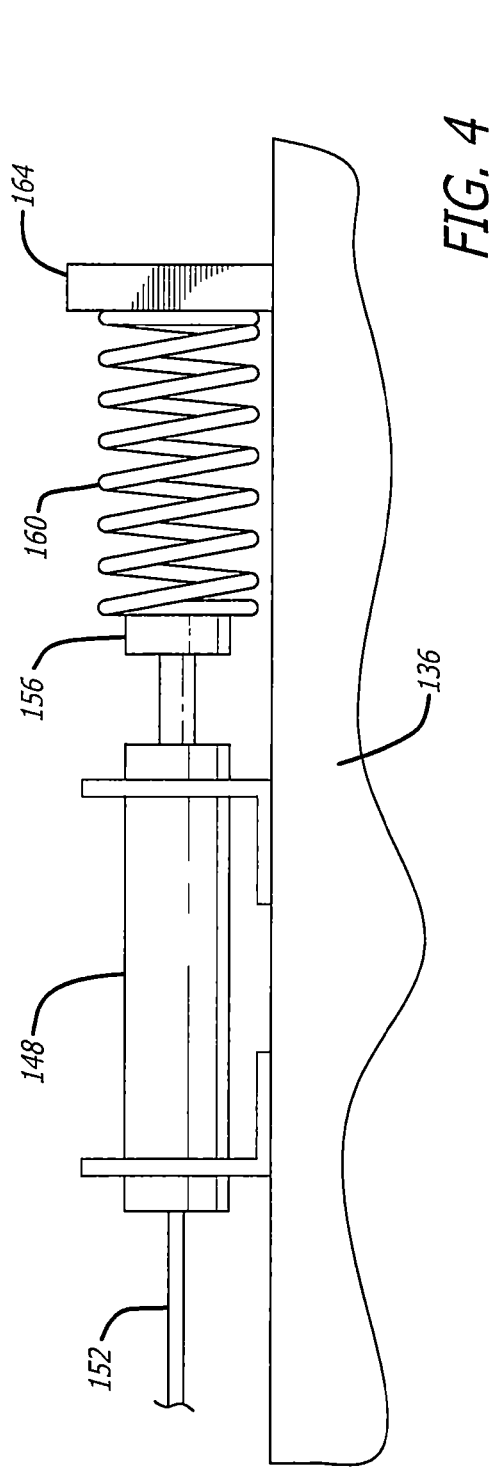
FIG. 4 illustrates a close-up view of an exemplary embodiment of the present disclosure, comprising a spring mounted between a spring cylinder and a fixed spring stop, comprising part of the suspension system of FIG. 3.

FIG. 3 illustrates an exemplary embodiment of a suspension system 140 that may be incorporated into an off-road vehicle, such as vehicle 100. Suspension system 140 comprises a hydraulic wheel cylinder 144 that is mounted between lower A-arm 132 and chassis 136, in lieu of coil spring 124 and damper 128 of FIG. 2. In the system 140 of FIG. 3, the wheel cylinder 144 is in fluid communication with a spring cylinder 148 by way of a hydraulic hose 152. As best shown in FIG. 4, the spring cylinder 148 includes a piston 156 that is in mechanical communication with a spring 160 that is in contact with a fixed spring stop 164. Spring 160 is a linear spring that is configured to exhibit a spring force that increases linearly as spring 160 is compressed, but could also comprise a multi-rate spring, multiple springs of different rates, or a gas spring exhibiting progressive characteristics. Spring stop 164 may comprise any reinforced surface that remains fixed with respect to spring cylinder 148. It is contemplated that, in some embodiments, spring stop 164 may comprise any surface of chassis 136 that is suitable for receiving the forces of spring 160, without limitation.

During operation of the hydraulic suspension system 140, upward forces on wheel 120, due to the wheel's contact with the ground, exert compressive forces on wheel cylinder 144. Accordingly, wheel cylinder 144 exerts compressive forces on a hydraulic fluid, which transfers these forces through hydraulic hose 152 and into spring cylinder 148. Spring cylinder 148 then pushes piston 156 against spring 160. Thus, the hydraulic suspension system 140 effectively transfers forces from wheel 120 to spring 160, and vice versa, through this path of fluid communication.

Although wheel cylinder 144 is coupled between suspension arm 132 and chassis 136, spring cylinder 148 and spring 160 may be installed in any advantageous location on vehicle 100, including locations that are remote from wheel cylinder 144, as shown in FIG. 3. Hydraulic hose 152 may include any length suitable for routing fluid communication between wheel cylinder 144 and spring cylinder 148.

Figure 5:
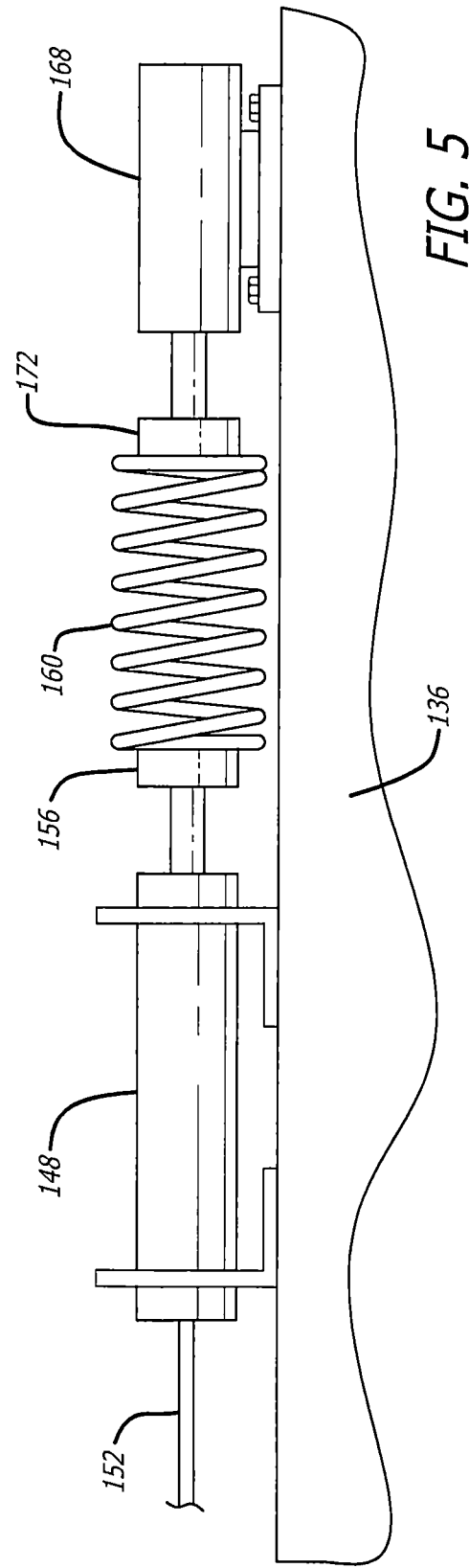
FIG. 5 illustrates a close-up view of an exemplary embodiment of the present disclosure, comprising a spring mounted between a spring cylinder and a control actuator, comprising an alternative embodiment of the suspension system of FIG. 3.

Turning now to FIG. 5, in some embodiments, a control actuator 168 may be incorporated into hydraulic suspension system 140, in lieu of the fixed spring stop 164 shown in FIGS. 3-4. As shown in FIG. 5, control actuator 168 is configured to press a piston 172 against spring 160, in opposition to the piston 156. When the control actuator 168 extends piston 172, spring 160 becomes compressed between pistons 156 and 172. Consequently, the spring force of spring 160 pushes piston 156 deeper into spring cylinder 148, causing hydraulic fluid to flow through hydraulic hose 152 into wheel cylinder 144. Increasing pressure within wheel cylinder 144 exerts a downward force on the wheel 120. As will be appreciated, therefore, when control actuator 168 retracts piston 172 away from spring 160, the downward force exerted onto wheel 120 by wheel cylinder 144 decreases. The control actuator 168 may be of any design sufficient to hold the spring force generated by spring 160. For example, the control actuator 168 may be electrically powered (e.g., a ball screw driven via an electric motor), mechanically powered (e.g., a ball screw driven via a hand crank) or hydraulically powered (e.g., a hydraulic cylinder driven via a pressurized hydraulic fluid).

Figure 6:
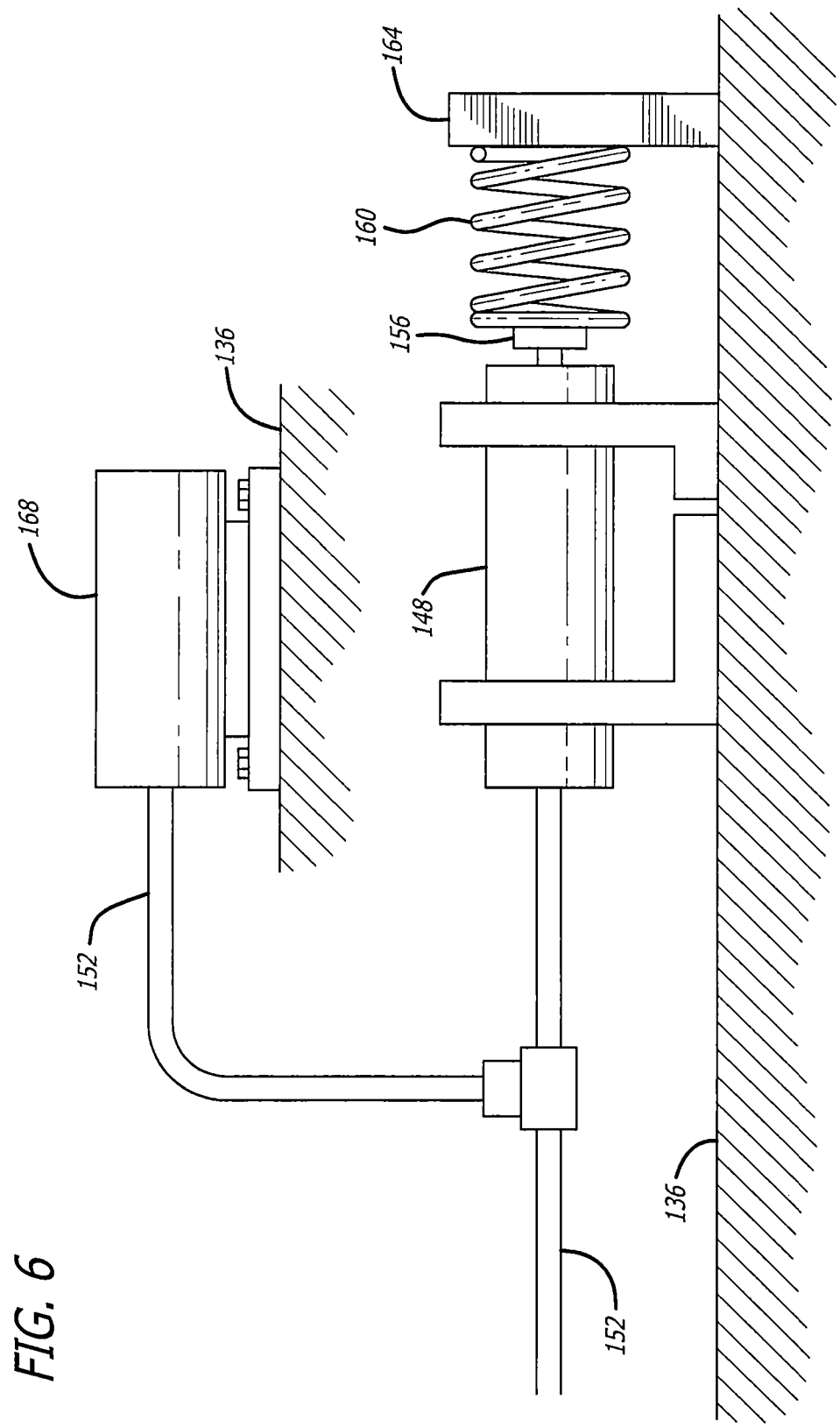
FIG. 6 illustrates a close-up view of an exemplary embodiment of the present disclosure, comprising a spring mounted between a spring cylinder and a fixed spring stop, and a control actuator forming part of the hydraulic circuit between the wheel cylinder and the spring cylinder, comprising an alternative embodiment of the suspension system of FIG. 5.

FIG. 6 shows an alternative implementation of the system shown in FIG. 5. In FIG. 6, control actuator 168 is configured to be part of the hydraulic circuit connecting wheel cylinder 144 and spring cylinder 148. In the FIG. 6 implementation, the control actuator provides the same functionality as the control actuator shown in FIG. 5 but operates by directly pushing on the hydraulic fluid in circuit 152, rather than by pushing on spring 160.

It is to be understood that the hydraulic suspension system 140 is not limited to any particular wheel of vehicle 100, and instead may be implemented at all wheels or only selected wheels. Additionally, it is to be understood that the control actuator 168 shown in FIG. 5 is not limited to any particular spring cylinder 148, and instead may be implemented at all spring cylinders or only selected spring cylinders. That said, including one control actuator 168 for each wheel of the vehicle will enable control over the individual spring forces at each wheel, which provides significant benefits discussed below.

With reference again to FIGS. 3-6, in some embodiments, the hydraulic suspension system 140 may utilize a dual rate spring, where spring 160 is combined with a secondary spring that exhibits different properties than spring 160. For example, spring 160 may be an extended length low spring rate, and it may be combined with a second spring that is shorter and of higher rate. It is further contemplated that a spring stop (not shown in the drawings) may be configured such that spring 160 is subjected to loads during only a portion of the suspension's travel, and that the secondary spring is subjected to loads during the entire range of the suspension's travel. As such, during the first portion of the suspension's travel, the spring rate is the combined rate of spring 160 and the secondary spring (e.g., a low rate), while during the second portion of the suspension's travel, the spring rate is solely that of the secondary spring (e.g., a high rate).

Because spring 160 can be remotely mounted on chassis 136, it is contemplated that the low rate of spring 160 can be applied to a much greater percentage of the suspension travel than is conventionally possible. In some embodiments, for example, the low rate of spring 160 can be applied for the first 80% of the suspension's travel, while the high rate of the secondary spring can be applied for only the final 20% of the suspension's travel. As will be recognized, traditional suspension systems, such as the conventional suspension system 102, cannot be configured to achieve this ratio, as conventional springs cannot be physically mounted to achieve such a ratio.

Moreover, it should be understood that hydraulic suspension system 140 is not limited to only one or two springs, but rather multiple springs in addition to spring 160 can be used, without limitation. In some embodiments, for example, two or more springs may be combined with spring 160 to form a triple-rate or even higher-rate suspension system. Further, in some embodiments, spring 160 or any of its accompanying springs may be progressively wound (or may be a gas spring), such that it exhibits a varying spring rate, as desired.

Although conventional suspension systems that include remotely mounted springs are known in the prior art, and are used fairly extensively in road racing cars, such systems typically rely upon mechanical linkages, and are thus limited by their physical size, strength, and location on a vehicle. Such mechanical linkages must be carefully configured to convey motion and forces between each wheel and a remotely located spring. By contrast, the hydraulic suspension system 140 merely requires a practitioner to route the hydraulic hose 152 to a desired location of the spring cylinder 148. Such mechanical linkages are also limited in their ability to alter motion ratios, as discussed below.

Among other things, the present invention overcomes all of the limitations of a traditional suspension system described hereinabove. In particular, the present invention enables the following:

Better Overall Performance through Low Wheel Rates with High Spring Preload.

A spring's "rate" is the amount of force required to compress the spring a given distance. For example, if a spring has a rate of 500 pounds per inch, it takes 500 pounds of force to compress the spring one inch. The "motion ratio" of a suspension is the ratio of the movement of the spring to the movement of the wheel. For example, if a suspension has a motion ratio of 1:2, it means that for every inch the spring moves, the wheel will move two inches. The "wheel rate" of a suspension is effectively the spring rate of the suspension system as a whole. Said differently, it is the spring rate measured at the wheel, rather than measured at the spring. Thus, the wheel rate is influenced by both the spring rate of the spring and also the motion ratio of the suspension system. For example, if the spring has a rate of 500 pounds per inch, and the suspension has a motion ratio of 1:2, it means that the wheel rate of the suspension is 250 pounds per inch (in other words, a 250-pound compressive force at the wheel will move the wheel upward by 1 inch and compress the spring by ½ of an inch).

Because the design of all conventional suspension systems limits the physical length of the spring, the spring rate must be chosen such that the spring generates sufficient force to support the vehicle within the physical space available for the spring. In other words, because the length of the spring is limited, there is a lower limit on the spring's possible rate. Using FIG. 2 as an example, assume that coil spring 124 must generate 1,000 pounds of force in order to support chassis 136. If spring 124 had a high rate—say, 10,000 pounds per inch—then spring 124 would only have to compress ¹⁄₁₀th of an inch in order to generate the required 1,000 pounds of force. A spring with such a high rate would easily fit within the space available on a typical off-road vehicle. Conversely, if spring 124 had a low rate—say, 10 pounds per inch—then spring 124 would have to compress 100 inches in order to generate the required 1,000 pounds of force. A spring with such a low rate would thus have to be very long (probably 200 to 300 inches long) and would not fit within the space available on a typical off-road vehicle. Thus, a designer cannot use a spring with a spring rate of only 10 pounds per inch. Instead, the designer must select a stiffer spring.

Conventional suspension systems also limit the possible range of motion ratios to a fairly narrow band. Using FIG. 2 as an example, by changing the upper and lower mounting locations of spring 124, the designer can alter the motion ratio—but there are practical limits as to how low the motion ratio can be with this type of suspension design. For example, a low motion ratio could be achieved by moving the lower mounting point of spring 124 on lower A-arm 132 closer to the mounting point of A-arm 132 on chassis 136, but moving the mounting point in this fashion greatly increases the bending force on lower A-arm 132, eventually to the point that A-arm 132 would have to be too heavy and large to be practical. Thus, there is a limit on how low the motion ratio can be with conventional off-road vehicle suspension system designs. Similarly, it is impossible with conventional off-road vehicle suspension system designs, such as that shown in FIG. 2, to have a positive motion ratio where spring 124 travels more than wheel 120 for any given increment of movement by wheel 120. Thus, there is a limit on how high the motion ratio can be (specifically, 1:1) with conventional off-road vehicle suspension system designs.

With the present invention, the remote mounting of the spring cylinder 148 and the spring 160 enables the use of a much longer spring than would physically fit in a traditional suspension design, as shown in FIG. 2. For example, the spring cylinder 148 can be located in an area of the vehicle where there is significant room for spring 160, enabling spring 160 to be up to several multiples of the length of spring 124 shown in FIG. 2. Using a longer spring, in turn, enables the use of a lower wheel rate. Lower wheel rates are particularly advantageous for travelling over rough terrain, as discussed in more detail below.

Similarly, with the present invention, coupling the spring cylinder 148 and the wheel cylinder 144 using a hydraulic system provides for a very wide range of possible motion ratios. For example, in some embodiments, system 140 may have a motion ratio of 1:5, 1:10 or even 1:20. As will be appreciated, motion ratios this low are impractical with conventional suspension systems, but are easy to achieve using the present invention, simply by varying the size of the hydraulic piston in wheel cylinder 144 in relation to the size of the hydraulic piston in spring cylinder 148.

Using a low motion ratio synthetically increases the length of the spring. For example, with a motion ratio of 1:10, for each inch wheel 120 moves upward, spring 160 would compress by only ¹⁄₁₀th of an inch. Thus, this 1:10 motion ratio has effectively made spring 160 10 times longer than a comparable spring used with a 1:1 motion ratio. Thus, these low motion ratios also enable the use of a lower wheel rate, by effectively increasing the length of the spring. Further, with the present invention, it is also possible, should it be desired, to have a motion ratio greater than 1, wherein the spring moves more than the wheel.

With the present invention, it is contemplated that the hydraulic suspension system 140 will enable the implementation of a wheel rate that is much lower than possible with traditional suspension systems. Low wheel rates are advantageous for vehicles operating on rough terrain because a lower wheel rate results in a more compliant suspension—one that flexes more over the terrain, leading to more consistent tire contact with the ground and less disturbance of the chassis, thus leading to enhanced control, speed, comfort, and safety.

It is further contemplated that spring 160 is to be installed with significant "preload," much more than used in traditional suspension systems. Preload is the measure of spring compression when the suspension is fully extended. For example, assume that wheel 120 is in the fully drooped position, as if vehicle 100 was suspended in the air without the wheels touching the ground. The "preload" on spring 160 would be the amount that spring 160 is compressed with the suspension in this fully drooped position.

Preload enables the use of a low wheel rate because it helps the spring build the absolute force necessary to support the chassis 136, despite the low wheel rate, within the available suspension travel of the vehicle. For example, assume that spring 160 needs to generate 1,000 pounds of force on piston 156 in order to support chassis 136. Further assume that spring 160 has a rate of 100 pounds per inch, meaning that spring 160 needs to be compressed 10 inches in order to generate 1,000 pounds of force. One possible way to generate 10 inches of compression would be to raise wheel 120 upwards until spring 160 is compressed 10 inches, but that approach would result in chassis 136 being lower to the ground (a negative for an off-road vehicle) and may not even be possible given the total available range of suspension travel of wheel 120. A better way to generate 10 inches of compression is to simply compress (i.e., preload) spring 160 by 10 inches before it is installed in the vehicle. Using preload in this fashion results in wheel 120 still retaining its full range of suspension travel and results in chassis 136 being higher off the ground.

Utilizing a high preload and a low wheel rate reduces the variability of the wheel force throughout the travel of the suspension. The "wheel force" of a suspension is the absolute downward force being generated by the suspension spring on the wheel, measured at the wheel. Thus, the wheel force is influenced by both the inherent force of the springs and also and the motion ratio of the suspension. Said differently, the wheel force at any given point in time equals the wheel rate multiplied by the amount suspension compression, plus the preload value. For example, assume the conventional suspension system 102 of FIG. 2 has a suspension travel of 20 inches, a wheel rate of 100 pounds/inch, and a preload measured at the wheel of 100 pounds. At full droop, wheel 120 is subjected to a wheel force of 100 pounds, which is the amount of preload measured at the wheel. At full compression, wheel 120 is subjected to a total wheel force of (20 inches*100 pounds/inch)+100 pounds=2100 pounds of force. Thus, the total variance from full droop to full compression of the conventional suspension system 102 is 2000 pounds. In another example, assume the hydraulic suspension system 140 of FIG. 3 has a suspension travel of 20 inches, a wheel rate of 25 pounds/inch, and a preload measured at the wheel of 500 pounds. At full droop, wheel 120 is subjected to a wheel force of 500 pounds, which is the amount of preload at the wheel. At full compression, wheel 120 is subjected to a total wheel force of (20 inches*25 pounds/inch)+500 pounds=1000 pounds of force, yielding a total variance from full droop to full compression of only 500 pounds. It is straightforward to see, therefore, that the high preload and low wheel rate gives rise to a relatively low variability of wheel force throughout the travel of the suspension.

Reduced variability of the wheel force has been observed to provide significant improvements over conventional suspension systems. For example, reduced variability leads to a smoother and more controlled ride for chassis 136, as the forces exerted on chassis 136 by the suspension are similarly less variable. This smoother ride increases control, speed, comfort, and safety. Similarly, the force between wheel 120 and the road surface is less variable. Tires tend to generate more traction and have more predictable and consistent characteristics when they are under constant loading as, among other things, constant loading minimizes the tire's inherent tendency to distort the shape of the contact patch in response to load variations. Further, the compressive force on the tire sidewall is similarly less variable, thereby minimizing variances in deflection of the tire sidewall. Deflection of the tire sidewall is undesirable, as it cannot be controlled by the vehicle's suspension, leading to uncontrolled movement of the chassis and unpredictable handling as the vehicle bounces on the tires, and the tires themselves distort in shape.

Faster Rebound Performance; Less Rebound Damping.

Another benefit of using high preload with a low wheel rate is that the damping of the suspension in rebound (i.e., damping when the wheels are extending downward, away from the chassis) can be substantially reduced and simplified. In turn, this results in better rebound performance (i.e., the wheels droop faster, and thus stay in contact with the ground longer), and less complex and costly rebound dampers.

A system with a high preload and a low wheel rate requires less rebound damping, and less sophisticated rebound damping, than a traditional suspension system for three reasons. First, there is less absolute force to control, meaning that less damping is needed. Using the examples above, the traditional suspension system exhibits 2100 pounds of wheel force at full compression, while the high preload low-rate suspension exhibits only 1000 pounds of force at full compression. This means that the dampers in the traditional system must control 2100 pounds of force while the dampers in the high preload low-rate system must control only 1000 pounds of force. Because there is less absolute force, the damping can be less, and the damper can be smaller and less costly.

Second, because there is less absolute force being generated by the springs, there is less of a tendency for the chassis to "kick" if rebound damping is insufficient. With traditional suspension systems, where the springs generate forces that are much greater than the weight of the chassis, there can be a dangerous tendency for the chassis to rise upward in an uncontrolled fashion if the suspension is compressed greatly and then quickly released from compression. This is called "kicking." For example, if an off-road vehicle with a traditional suspension system lands off a jump and fully compresses the suspension, and there is insufficient rebound damping to control the spring forced generated at full compression, then the springs will push the chassis upward too fast, eventually causing the tires to become unloaded and possibly even causing the entire vehicle to essentially bounce off the ground. This results in a loss of control, comfort, and safety. With the present invention, this tendency is reduced, because there is simply less absolute force being generated by the springs in relation to the weight of the chassis. This enables the use of less rebound damping and smaller, less costly rebound dampers.

Third, there is less variability in wheel force, as discussed above. Using the examples described hereinabove, the traditional suspension system exhibits 2100 pounds of wheel force at full compression and 100 pounds of wheel force at full droop, while the high preload low-rate suspension exhibits 1000 pounds of force at full compression and 500 pounds of force at full droop. This means that the dampers in the traditional system must control a force that varies by 2000 pounds, while the dampers in the high preload low-rate system must control a force that only varies by 500 pounds. This reduced variability enables the use of less rebound damping and smaller, less costly rebound dampers.

Advantageous Packaging.

It is contemplated that remotely mounting the spring cylinder 148 and the spring 160 facilitates an advantageous weight distribution of vehicle 100, as the springs and their associated weight can be placed in a desirable location. Similarly, remote mounting the springs also improves the overall aerodynamics of vehicle 100 by relocating bulky components deeper within vehicle 100, out of the wind stream normally surrounding the wheels and suspension members.

Control of Spring Preload in Response to Weight Changes.

The control actuator 168 version of suspension system 140 (hereinafter referred to as the "Active Suspension") allows the preload on suspension spring 160 to be adjusted in response to changes in weight of chassis 136. This is an advantage over conventional off-road suspension systems, where spring preload is fixed or, if adjustable, not easily adjustable. With a traditional off-road suspension system, as occupants, fuel and cargo are added to the vehicle, the chassis will sink lower to the ground. Similarly, as occupants, fuel, and cargo are removed from the vehicle, the chassis will rise. This forces designers of off-road vehicles to make a design trade off. On the one hand, the chassis must be high enough so that it can traverse rough terrain without striking the ground, even when fully loaded with occupants, fuel, and cargo. On the other hand, the chassis must be low enough that the vehicle will not tip over when traversing steeply banked terrain, or roll or pitch excessively while cornering, braking, and accelerating. Designers are often forced to solve this problem by specifying components for the worst-case scenario of a heavily loaded vehicle traversing rough terrain. When these worst-case scenario components are then used in a more moderate scenario—for example, a smooth road or a lightly loaded chassis—the result is that the components are not optimized for these conditions, resulting in a chassis that has an unnecessarily high ride height, or springs that are unnecessarily stiff, or both.

The Active Suspension solves this tradeoff, by allowing the preload on suspension spring 160 to be adjusted in real time. As weight is added to chassis 136, preload can be increased so as to maintain the desired ride height. Conversely, as weight is removed from chassis 136, preload can be decreased so as to maintain the desired ride height. These adjustments happen quickly and easily, and can be done by the driver or by an onboard computer that measures vehicle parameters such as average ride height, fuel load, suspension forces, etc. As such, the designer is not forced to specify components for the worst-case scenario. Instead, the designer can specify components for the most likely scenario, and then the Active Suspension can compensate when more adverse circumstances are encountered.

Control of Spring Preload to Adjust Ride Height.

The Active Suspension also facilities real-time changes to the ride height of vehicle 100. For example, the Active Suspension enables vehicle 100 to be lowered for operation on smooth roads so as to improve handling and reduce aerodynamic drag. Conversely, when traveling on rough roads, the Active Suspension may be used to raise vehicle 100 so as to provide greater ground clearance.

Control of Spring Preload to Increase or Decrease Weight Transfer.

By facilitating real-time changes to the right height of vehicle 100, the driver or the computer system controlling ride height can vary the weight transfer characteristics of the suspension system. When the chassis is raised, weight transfer is increased because the vehicle's center of gravity is raised. For example, when the ride height is raised, the chassis will transfer more weight to the outside wheels in a turn, and more weight to the rear wheels while accelerating. Conversely, when the chassis is lowered, the chassis will transfer less weight to the outside wheels in a turn, and less weight to the rear wheels while accelerating. Depending on the operating conditions of the vehicle, it may be desirable to have more or less weight transfer. For example, while turning, it would typically be desirable to have less weight transfer, as less weight transfer will maximize traction and minimize the tendency of the chassis to lean. Conversely, if the vehicle is two-wheel drive and driven by only the rear wheels, it would be desirable to have more weight transfer while accelerating, as this increased weight transfer will add load to the rear tires, increasing traction.

Control of Spring Preload to Compensate for Chassis Roll and Pitch.

The Active Suspension can be used to enhance the handling of vehicle 100 by counteracting the roll and pitch of chassis 136, which could be induced by a myriad of factors. For example, the Active Suspension can be used to counteract the leaning of chassis 136 during cornering by extending control actuators 168 on the outside of vehicle 100 and retracting control actuators 168 on the inside of vehicle 100. It is envisioned that a suitable computer control system onboard vehicle 100 may be used to determine the degree of roll of chassis 136, such as by way of measuring lateral acceleration, vertical acceleration, steering angle, vehicle speed, yaw of chassis 136 about the vertical axis, or yaw of chassis 136 about the longitudinal axis, and then operate the control actuators 168 to counteract the roll. As will be appreciated, the rolling movements of chassis 136 may be measured by way of any of various suitable sensors, without limitation.

Similarly, the Active Suspension can be used to counteract the pitching of chassis 136 due to braking and accelerating of vehicle 100. In one exemplary embodiment, a suitable computer control system onboard vehicle 100 may be used to determine the degree of pitching of chassis 136, such as by way of measuring longitudinal acceleration, vertical acceleration, vehicle speed, throttle position, brake line fluid pressure, or yaw of chassis 136 about the horizontal left-to-right axis of vehicle 100, and then operate control actuators 168 to counteract the pitching. For example, during braking of vehicle 100, control actuators 168 coupled with the front wheels 120 may be extended to lift the front of chassis 136 while the control actuators 168 coupled with the rear wheels 112 may be retracted to lower the rear of chassis 136 and thus counteract the forward pitching. While accelerating vehicle 100, the control actuators 168 would operate in the reverse manner, to counteract the rearward pitching of chassis 136. As will be appreciated, the pitching movements of chassis 136 may be measured by way of any of various suitable sensors, without limitation.

Controlling chassis roll and pitch is advantageous for several reasons. First, it makes vehicle 100 easier to drive and more comfortable. A chassis that remains level is inherently easier to control and less disruptive to occupants and cargo than a chassis that rolls and pitches. Second, it preserves suspension travel, allowing that travel to be used to traverse obstacles, rather than wasting suspension travel through roll and pitch. For example, with a conventional suspension system, when vehicle 100 brakes aggressively, the chassis will pitch forward significantly. This pitching causes the front suspension to compress. When the front suspension compresses, it has less available up-travel to flex over road disturbances. As a result, the ride of vehicle 100 can become very rough when braking, as the front suspension does not have sufficient up-travel to absorb bumps. On the other hand, the Active Suspension, by eliminating the pitching movement of the chassis, will preserve all of the available up-travel in the suspension, allowing the suspension to continue to absorb significant bumps while the vehicle is braking aggressively.

Control of Spring Preload to Compensate for Aerodynamic Loads.

The Active Suspension can be used to enhance the handling of vehicle 100 by counteracting the pitching and ride height changes induced by aerodynamic forces. For example, the Active Suspension can be used to counteract the tendency of chassis 136 to pitch backwards at high speed, due to aerodynamic forces pushing upwards on the front of chassis 136 (or, pushing downward on downforce generating devices, such as wings or underbody aerodynamic devices). This would reduce aerodynamic drag, increasing speed and efficiency, and reduce aerodynamic lift, increasing traction and stability. It is envisioned that a suitable computer control system onboard vehicle 100 may be used to determine the degree of pitch of chassis 136, such as by way of measuring vehicle speed, wind speed, or absolute pitch of chassis 136 in comparison to a reference plane, and then operate the control actuators 168 to counteract the pitch. As will be appreciated, the pitching movements of the chassis 136 may be measured by way of any of various suitable sensors, without limitation.

Control of Spring Preload to Compensate for Engine Torque.

The Active Suspension can be used to enhance the handling of vehicle 100 by counteracting the tendency of chassis 136 to roll in response to engine torque. For example, in vehicles that combine a powerful engine with low wheel rates, engine torque can cause the chassis to roll when the engine is producing significant torque output. As described above, a suitable computer control system onboard vehicle 100 may be used to determine the degree of roll of chassis 136 by receiving sensory inputs pertaining to vehicle speed, throttle position, lateral acceleration, longitudinal acceleration, or yaw of chassis 136 about the longitudinal axis of vehicle 100. Once the degree of roll of chassis 136 is determined or approximated, the computer control system can extend and retract appropriate control actuators 168 to optimally counteract the roll. As will be appreciated, the roll movements of the chassis 136 may be measured by way of any of various suitable sensors, without limitation.
Eliminates Need for Anti-Roll Bars.

Another benefit of the Active Suspension is that vehicle 100 will not require anti-roll bars. Not needing anti-roll bars is meaningful for two reasons. First, anti-roll bars work by increasing the spring rate of the suspension when horizontally opposed wheels of the suspension move in different directions. This increase in spring rate tends to force the horizontally opposed wheels to remain parallel with each other, reducing the tendency of the chassis to roll during turns. However, this increase in spring rate also occurs when a single wheel rises over a bump or falls into a hole. In that case, the increase in spring rate from the anti-roll bar actually destabilizes the chassis, by causing the chassis to roll when instead it would be desirable for the chassis to remain level. On vehicles designed for operation on paved roads, this destabilization is minimal, since the bumps and holes encountered on paved roads are small. However, on vehicles designed for operation on unpaved roads or off-road, this destabilization can be severe, as the bumps and holes can be large. Second, anti-roll bars are traditionally mechanical devices, that must physically connect horizontally opposed wheels. As such, these devices occupy valuable space on the vehicle, limiting design freedom, must be physically close to the wheels, also limiting design freedom, and must be physically robust enough to support significant suspension induced loads, increasing weight and cost.
Limited Need for Low-Speed Suspension Damping.

A drawback to all conventional off-road suspension systems is that a significant tradeoff must be made when selecting the damping rates for the suspension. On the one hand, the designer will want to select the softest damping rates possible, as this will enhance the vehicle's performance over rough terrain. On the other hand, the designer will want to select damping rates that are stiff enough to controls the tendency of the chassis to roll during cornering and pitch during braking and acceleration.

Because the Active Suspension compensates for the tendency of the chassis to roll and pitch during cornering, braking and acceleration, the dampers used with the Active Suspension need not control the chassis in response to these movements. Not needing suspension dampers that resist roll and pitch is a meaningful benefit, because designing a damper that adequately controls for low-speed movements of the suspension, such as roll and pitch, while also adequately controlling mid- and high-speed movements of the suspension, such as those occurring when the wheels travel over a bump or into a hole, is difficult at best, and sometimes even impossible given current technology. Almost all dampers rely on the principal of a hydraulic fluid flowing through an orifice. Due to the laws of fluid dynamics, the resistance of fluid flow through the orifice increases at an exponential rate to the speed of flow. This means that a damper with a fixed orifice will offer little resistance to low speed movements in comparison to significant resistance to high-speed movements. This type of damping profile—little resistance to low-speed movements, with strong resistance to high-speed movements—is undesirable, as most designers want the exact opposite—strong resistance to low speed movements, or limit roll and pitch, and little resistance to high-speed movements, to allow the wheels to easily move over rough terrain. As a result, most modern dampers include variable sized orifices, which attempt to provide stiffer damping at low speeds and softer damping at high speeds. However, the effectiveness of these damper designs is often not ideal, and many such designs are complex and expensive. Thus, it is of a significant advantage to not rely on the dampers to control low speed movements of the chassis, and instead only rely on the dampers to control mid- and high-speed movements of the suspension.
Predictive Suspension Response Through Driver Interface.

Turning again to FIGS. 5 and 6, a driver control interface may be included within vehicle 100 and configured to enable a driver of vehicle 100 to provide real-time inputs into the above-mentioned computer control system of the Active Suspension. It is contemplated that the driver control interface may include any of various buttons, knobs, switches, pedals, levers, and the like, whereby the driver may control the ride height of the vehicle, as well as control the aggressiveness with which the computer control system counteracts roll and pitch of chassis 136.

In some embodiments, an emergency function may be incorporated into the driver control interface, whereby occupants within vehicle 100 may declare an emergency situation to the computer control system. In one exemplary embodiment, a large pushbutton may be disposed within the vehicle and configured to activate the emergency function upon being pushed by the driver's or an occupant's hand or stepped on via the driver's or an occupant's foot. In another exemplary embodiment, a third pedal is disposed within the driver cockpit, to the left of the brake pedal, and configured to activate the emergency function when depressed. In some embodiments, the emergency function may be activated by way of any of various buttons, knobs, switches, levers, and the like.

It is contemplated that the driver or other occupants within vehicle 100 may desire activating the emergency function due to observed road hazards, such as an impending impact, a large hole in the road, a large obstacle on the road, etc. Upon the emergency function being activated, the computer control system may automatically perform any of various responsive actions, such as, by way of non-limiting example, raising chassis 136 to a maximal ride height, maximizing the aggressiveness of the counteracting forward pitching of chassis 136, increasing damping levels, applying the brakes, cutting the engine throttle, tightening vehicle occupant safety restraints, sounding an alarm, transmitting an emergency signal to a third party monitoring system not located on vehicle 100, and the like.

Prior art suspension systems have included functions that attempt to stabilize the vehicle during an emergency situation, such as the "stability control systems" common on many road cars that will modulate engine throttle and apply brakes in an attempt to keep the vehicle under control. However, these prior art systems are all reactive and attempt to stabilize the vehicle after an emergency has started to occur. In that regard, these prior art systems all rely on automated sensors in order for the computer control system to determine when an emergency situation has already occurred. On the other hand, the present invention, by relying on the driver and occupants to predict an impending emergency, is forward looking in nature, and relies on the judgment of the driver and occupants to inform the computer when an emergency is about to occur. Thus, the present invention is superior to prior art systems that are purely reactive, rather than predictive. Additionally, the prior art systems focus only on the stability of the vehicle (e.g., keeping control while braking in the rain), or on an impeding crash (e.g., tightening occupant restraints), as opposed to preparing the vehicle for traversing a large off-road obstacle, such as a large hole or large bump.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A suspension system for an off-road vehicle, the suspension system comprising:
    a wheel cylinder for communicating forces on a wheel to a spring cylinder;
    a spring cylinder for communicating forces to a spring;
    the spring for creating forces on the spring cylinder wherein the spring comprises a progressive spring that is configured to exhibit a spring force that increases at a non-linear rate as the spring is compressed; and
    a spring stop for fixating the spring with respect to the spring cylinder;
    wherein a configuration of the abovementioned wheel cylinder, spring cylinder and spring stop is such that it enables the use of the spring that is physically too large to be mounted between the vehicle's chassis, on the one hand, and a suspension component, on the other hand.

2. The suspension system of claim 1, wherein the spring consists of more than one spring.

3. The suspension system of claim 1, wherein the suspension is configured to exhibit a wheel rate that is less than the lowest wheel rate that could be obtained using the spring that is physically small enough to be mounted between the vehicle's chassis, on the one hand, and a suspension component, on the other hand.

4. The suspension system of claim 1, wherein the spring is configured to have static preload of least 20% of its free length.

5. The suspension system of claim 1, wherein the suspension is configured to have a wheel-to-spring motion ratio of 2.25:1 or greater.

6. A suspension system for an off-road vehicle, the suspension system comprising:
    a wheel cylinder for communicating forces on a wheel to a spring cylinder;
    a spring cylinder for communicating forces to a spring;
    the spring for creating forces on the spring cylinder; and
    a control actuator that is configured to either press against the spring, in lieu of a fixed spring stop, or press against the hydraulic circuit connecting the spring cylinder to the wheel cylinder wherein extending the control actuator adds spring force to the suspension and retracting the actuator removes spring force from the suspension;
    wherein a configuration of the abovementioned wheel cylinder, spring cylinder and control actuator is such that it enables the use of the spring that is physically too large to be mounted between the vehicle's chassis, on the one hand, and a suspension component, on the other hand, and/or a control actuator that is physically too large to be mounted between the vehicle's chassis, on the one hand, and spring, on the other hand, if the spring had been mounted in a traditional prior-art location between the vehicle's chassis, on the one hand, and a suspension component, on the other hand.

7. The suspension system of claim 6, wherein the control actuator is configured to operate in response to commands from the vehicle's occupants.

8. The suspension system of claim 6, wherein the control actuators are configured to raise the vehicle so as to provide greater ground clearance, or lower the vehicle to provide increased handling or aerodynamic performance.

9. A method for a hydraulic suspension system for an off-road vehicle, the method comprising:
    coupling a suspension component, on the one hand, and the chassis of the vehicle, on the other hand, through a hydraulic device, such as a hydraulic cylinder or hydraulic rotary actuator;
    establishing fluid communication between the abovementioned hydraulic device attached to the suspension with another hydraulic device in the vehicle, such as another hydraulic cylinder or hydraulic rotary actuator;
    providing a spring for applying a spring force to the second hydraulic device; and
    configuring a control actuator to either press against the spring, in lieu of a fixed spring stop, or press against the hydraulic circuit connecting the two hydraulic devices wherein extending the control actuator adds spring force to the suspension and retracting the actuator removes spring force from the suspension;
    wherein the configuration of the abovementioned hydraulic devices and control actuator is such that it enables the use of the spring that is physically too large to be mounted between the vehicle's chassis, on the one hand, and a suspension component, on the other hand, and/or a control actuator that is physically too large to be mounted between the vehicle's chassis, on the one hand, and spring, on the other hand, if the spring had been mounted in a traditional prior-art location between the vehicle's chassis, on the one hand, and a suspension component, on the other hand.

10. The method of claim 9, wherein configuring the control actuator includes configuring the control actuator to operate in response to commands from the vehicle's occupants.

11. The method of claim 9, wherein configuring the control actuator includes configuring the control actuator to operate according to electronic signals received from a suitable computer control system onboard the vehicle.

12. The method of claim 9, wherein configuring the control actuator includes configuring multiple control actuators to control individual spring forces applied to each of the vehicle's wheels.

13. The method of claim 9, wherein configuring the control actuator includes configuring the control actuator to raise the vehicle so as to provide greater ground clearance or lower the vehicle to provide increased handling or aerodynamic performance.

14. The method of claim 9, wherein configuring the control actuator includes configuring the control actuator and a suitable computer control system to counteract changes in weight and weight distribution of the vehicle.

15. The method of claim 9, wherein configuring the control actuator includes configuring the control actuator and a suitable computer control system to enhance handling of the vehicle by counteracting any one or more of chassis roll, chassis pitch, chassis heave, and chassis twist.

16. The method of claim 9, further comprising configuring a driver control interface to enable a driver of the vehicle to provide real-time inputs for the purpose of affecting the handling of the vehicle.

17. The method of claim 9, further comprising configuring an emergency function to enable occupants within the vehicle to declare an emergency situation by way of a driver control interface; and configuring the emergency function to cause the system to automatically perform any of various responsive actions, such as raising the vehicle.

\* \* \* \* \*